United States Patent
Branson et al.

(10) Patent No.: US 8,924,940 B2
(45) Date of Patent: *Dec. 30, 2014

(54) STREAMS DEBUGGING WITHIN A WINDOWING CONDITION

(71) Applicant: International Business Machines Corporation, Armonk, NY (US)

(72) Inventors: Michael J. Branson, Rochester, MN (US); Ryan K. Cradick, Oronoco, MN (US); John M. Santosuosso, Rochester, MN (US); Brandon W. Schulz, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/770,212

(22) Filed: Feb. 19, 2013

(65) Prior Publication Data

US 2013/0305227 A1    Nov. 14, 2013

Related U.S. Application Data

(63) Continuation of application No. 13/467,369, filed on May 9, 2012.

(51) Int. Cl.
*G06F 9/44* (2006.01)
*G06F 11/36* (2006.01)

(52) U.S. Cl.
CPC .......... *G06F 11/362* (2013.01); *G06F 11/3636* (2013.01)
USPC ............................. 717/128; 717/127; 717/129

(58) Field of Classification Search
USPC .......................................... 717/127, 128, 129
See application file for complete search history.

(56) References Cited

U.S. PATENT DOCUMENTS

| | | | |
|---|---|---|---|
| 5,754,839 A * | 5/1998 | Pardo et al. | 712/227 |
| 6,460,180 B1 * | 10/2002 | Park et al. | 725/40 |
| 7,203,927 B2 | 4/2007 | Al-Azzawe et al. | |
| 7,219,333 B2 | 5/2007 | Agarwala et al. | |
| 7,769,806 B2 * | 8/2010 | Van Wie et al. | 709/203 |
| 7,817,563 B1 * | 10/2010 | Buragohain et al. | 370/241 |
| 7,992,133 B1 * | 8/2011 | Theroux et al. | 717/124 |
| 2002/0174415 A1 | 11/2002 | Hines | |
| 2003/0115576 A1 * | 6/2003 | Bates et al. | 717/129 |

(Continued)

OTHER PUBLICATIONS

U.S. Appl. No. 13/467,369, entitled Streams Debugging Within a Windowing Condition, filed May 9, 2012.

*Primary Examiner* — Chameli Das
*Assistant Examiner* — Viva Miller
(74) *Attorney, Agent, or Firm* — Patterson & Sheridan LLP (57) ABSTRACT

Method product for performing an operation, the operation including providing a plurality of processing elements comprising one or more operators, the operators configured to process streaming data tuples. The operation then establishes an operator graph of multiple operators, the operator graph defining at least one execution path in which a first operator of the plurality of operators is configured to receive data tuples from at least one upstream operator and transmit data tuples to at least one downstream operator. The operation then defines a breakpoint, the breakpoint comprising a condition, the condition based on attribute values of data tuples in a window of at least one operator, the window comprising a plurality of data tuples in an operator. The operation, upon detecting occurrence of the condition, triggers the breakpoint to halt processing by each of the plurality of operators in the operator graph.

16 Claims, 7 Drawing Sheets

(56) References Cited

U.S. PATENT DOCUMENTS

| | | |
|---|---|---|
| 2004/0103397 A1* | 5/2004 | Agarwala et al. ............. 717/128 |
| 2004/0153818 A1* | 8/2004 | Woodall .......................... 714/37 |
| 2011/0178775 A1* | 7/2011 | Schoning et al. ............. 702/190 |
| 2011/0239048 A1* | 9/2011 | Andrade et al. ................ 714/35 |
| 2012/0047505 A1* | 2/2012 | Branson et al. ............... 718/100 |
| 2012/0066184 A1* | 3/2012 | Barsness et al. .............. 707/687 |
| 2012/0110042 A1* | 5/2012 | Barsness et al. .............. 707/825 |
| 2013/0014088 A1* | 1/2013 | Park et al. ..................... 717/128 |

* cited by examiner

STREAMS DEBUGGING WITHIN A WINDOWING CONDITION

CROSS-REFERENCE TO RELATED APPLICATIONS

This application is a continuation of co-pending U.S. patent application Ser. No. 13/467,369, filed May 9, 2012. The aforementioned related patent application is herein incorporated by reference in its entirety.

BACKGROUND

Embodiments of the present disclosure generally relate to stream computing applications using streaming data. Specifically, the embodiments disclose techniques for defining and triggering breakpoints to debug streams applications that use streaming data.

SUMMARY

Embodiments disclosed herein provide a method, system and computer program product for performing an operation, the operation including providing a plurality of processing elements comprising one or more operators, the operators configured to process streaming data tuples. The operation then establishes an operator graph of multiple operators, the operator graph defining at least one execution path in which a first operator of the plurality of operators is configured to receive data tuples from at least one upstream operator and transmit data tuples to at least one downstream operator. The operation then defines a breakpoint, the breakpoint comprising a condition, the condition based on attribute values of data tuples in a window of at least one operator, the window comprising a plurality of data tuples in an operator. The operation, upon detecting occurrence of the condition, triggers the breakpoint to halt processing by each of the plurality of operators in the operator graph.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein provide a method, system and computer program product for performing an operation, the operation including providing a plurality of processing elements comprising one or more operators, the operators configured to process streaming data tuples. The operation then establishes an operator graph of multiple operators, the operator graph defining at least one execution path in which a first operator of the plurality of operators is configured to receive data tuples from at least one upstream operator and transmit data tuples to at least one downstream operator. The operation then defines a breakpoint, the breakpoint comprising a condition, the condition based on attribute values of data tuples in a window of at least one operator, the window comprising a plurality of data tuples in an operator. The operation, upon detecting occurrence of the condition, triggers the breakpoint to halt processing by each of the plurality of operators in the operator graph.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Stream-based computing and stream-based database computing are emerging as a developing technology for database systems. Users may create applications that process and query streaming data before it reaches a database file. Users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating executables (i.e., processing elements), as well as replicating processing elements on multiple nodes and load balancing among them. Operators in a stream computing application can be fused together to form a larger processing element that is executable, akin to many procedures forming part of a larger program. Doing so allows processing elements to share a common process space, resulting in much faster communication between operators than is available using inter-process communication techniques (e.g., using a TCP/IP socket). Further, processing elements can be split across many nodes in a distributed environment, meaning that scalability can be reached by distributing an application across nodes by creating many small executable pieces of code.

Debugging code in a streams environment may be accomplished by examining log files that the code produces. However, in many cases, this simply isn't enough, and running a debug session is needed. A debug session may allow users to pinpoint errors which may not be detected by examining log files alone. An application developer may define breakpoints, the occurrence of which may trigger the debug session. Often times in a distributed environment, one wants a breakpoint to occur in an operator when events of a similar nature occur simultaneously. In streams or distributed computing, in general, simultaneous does not mean at the exact same time. In reality, in distributed computing, events cannot happen at the exact same time, but they often occur within a given time frame of each other. Furthermore, in a streaming data application, the events triggering a breakpoint may be detected across different operators and across multiple operator graphs. Handling events that occur within this time frame and allowing breakpoints to take effect when events occur within this time frame is the subject of this disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Figure 1A:
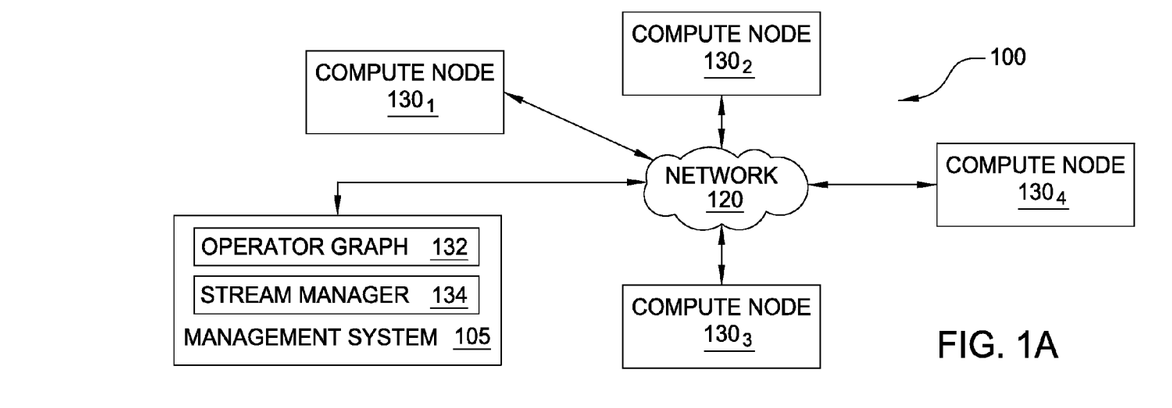
FIGS. 1A-1B illustrate a computing infrastructure configured to execute a stream computing application, according to embodiments disclosed herein.
Figure 1B:
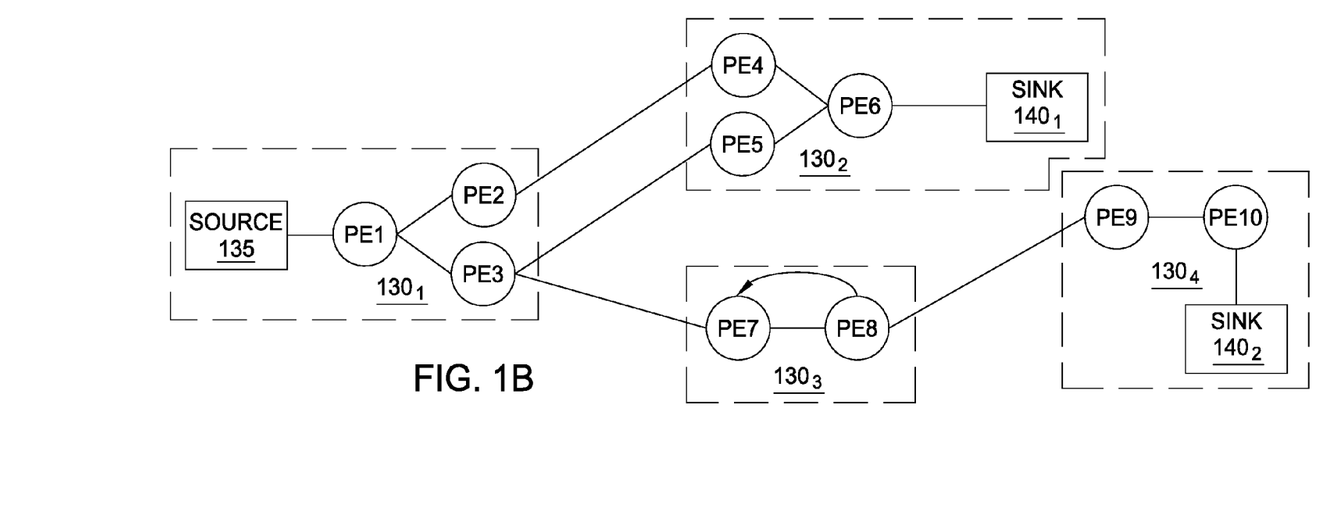

FIGS. 1A-1B illustrate a computing infrastructure configured to execute a stream computing application, according to one embodiment of the disclosure. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream computing application beginning from one or more operators in one or more source processing elements (PEs) through to one or more operators in one or more sink PEs. This flow from source to sink is also generally referred to herein as an execution path. Generally, data attributes flow into an operator of a source PE of a stream computing application and are processed by that operator. Typically, operators receive an N-tuple of data attributes from the stream as well as emit an N-tuple of data attributes into the stream (except for operators in a sink PE where the stream terminates). In general, a "tuple" is a single instance of a set of data attributes that follow the formatting of a schema, where the schema establishes a set of typed data attributes that may be used. For example, the tuple may be a chunk or portion of divisible data such as a data type (e.g., string, integer, Boolean, etc.) or combination of data types. In one embodiment, a "tuple" may include one or more attributes with an assigned value—e.g., Tuple 1: {sym="Fe", no=26} where "sym" and "no" are possible attributes in the schema (i.e., a string and integer, respectively) and "Fe" and "26" are the values.

Of course, the N-tuple received by an operator need not be the same N-tuple sent downstream. Additionally, operators could be configured to receive or emit tuples in other formats (e.g., the PEs or operators could exchange data marked up as XML documents). Furthermore, each operator within a PE may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the deployment of the operator graph 132. The stream manager 134 may move processing elements (PEs) from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements and operators (or what data tuples flow to the processing elements and operators) running on the compute nodes $130_{1-4}$. One example of a stream computing application is IBM®'s InfoSphere® Streams (InfoSphere® is a trademark of International Business Machines Corporation, registered in many jurisdictions worldwide).

FIG. 1B illustrates an example processing element graph that includes ten processing elements (labeled as PE1-PE10) running on the compute nodes $130_{1-4}$. A processing element is composed of one or more operators fused together into an independently running process with its own process ID (PID) and memory space. In cases where two (or more) processing elements are running independently, inter-process communication may occur using a "transport" (e.g., a network socket, a TCP/IP socket, or shared memory). However, when operators are fused together, the fused operators can use more rapid communication techniques for passing tuples among operators in each processing element.

As shown, the processing element graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into operators in the processing element PE1, which in turn emits tuples that are received by PE2 and PE3. For example, operators in PE1 may split data attributes received in a tuple and pass some data attributes to PE2, while passing other data attributes to PE3. Data that flows to PE2 is processed by the operators contained in PE2, and the resulting tuples are then emitted to the operators in PE4 on compute node $130_2$. Likewise, the data tuples emitted by the operators in PE4 flow to the operators sink PE6 $140_1$. Similarly, data tuples flowing from operators in PE3 to operators in PE5 also reach operators in sink PE6 $140_1$. Thus, in addition to being a sink for this example processing element graph, operators in PE6 could be configured to perform a join operation, combining tuples received from operators in PE4 and PE5. This example processing element graph also shows data tuples flowing from PE3 to PE7 on compute node $130_3$, which itself shows data tuples flowing to operators in PE8 and looping back to operators in PE7. Data tuples emitted from operators in PE8 flow to operators in PE9 on compute node $130_4$, which in turn emits tuples to be processed by operators in sink PE10 $140_2$.

Because a processing element is a collection of fused operators, it is equally correct to describe the processing element graph as execution paths between specific operators, which may include execution paths to different operators within the same processing element. FIG. 1B illustrates execution paths between processing elements for the sake of clarity.

In one embodiment, the stream manger 134 may be able to communicate with other operator graphs executing in a stream computing application. That is, the compute nodes 130 may host operator graphs executing in parallel. The stream manager 134 may be able to communicate with a stream manager associated with those parallel operator graphs using, for example, a shared memory where messages and commands may be passed. Alternatively, stream manager 134 may be part of a hierarchical arrangement of stream managers that allow the different stream managers to communicate. The stream manager 134 may use the manager hierarchy or the shared memory to instruct a different stream manager to optimize an operator graph in the stream computing application that is sharing the same compute nodes 130 (i.e., hardware resources) as the operator graph shown in FIG. 1B. Additionally, the hierarchical arrangement may manage stream managers across different compute nodes, for example, a first stream manager 134 for a first stream computing application owned by a first customer and a second stream manager 134 for a second stream computing application owned by a second customer.

Figure 2:
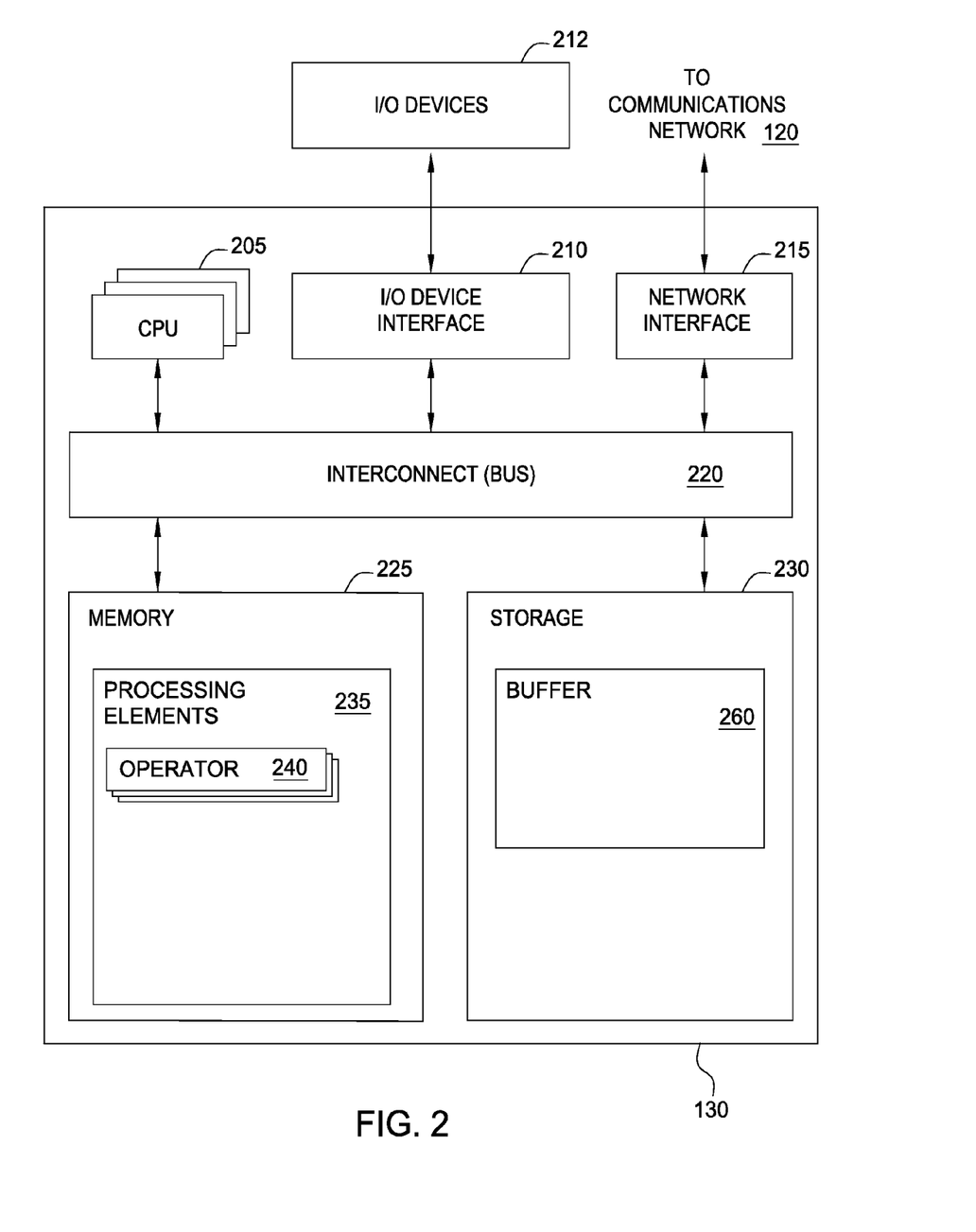
FIG. 2 is a more detailed view of the compute node of FIGS. 1A-1B, according to one embodiment disclosed herein.

FIG. 2 is a more detailed view of the compute node 130 of FIGS. 1A-1B, according to one embodiment disclosed herein. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. In one embodiment, a PE 235 is assigned to be executed by only one CPU 205 although in other embodiments the operators 240 of a PE 235 may comprise one or more threads that are executed on a plurality of CPUs 205. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235. Each PE 235 includes a collection of operators 240 that are fused together. As noted above, each operator 240 may provide a small chunk of code configured to process data flowing into a processing element (e.g., PE 235) and to emit data to other operators 240 in the same PE or to other PEs in the stream computing application. Such processing elements may be on the same compute node 130 or on other compute nodes that are accessible via communications network 120.

As shown, storage 230 contains a buffer 260. Although shown as being in storage, the buffer 260 may be located in the memory 225 of the compute node 130 or a combination of both. Moreover, storage 230 may include storage space that is external to the compute node 130.

Figure 3:
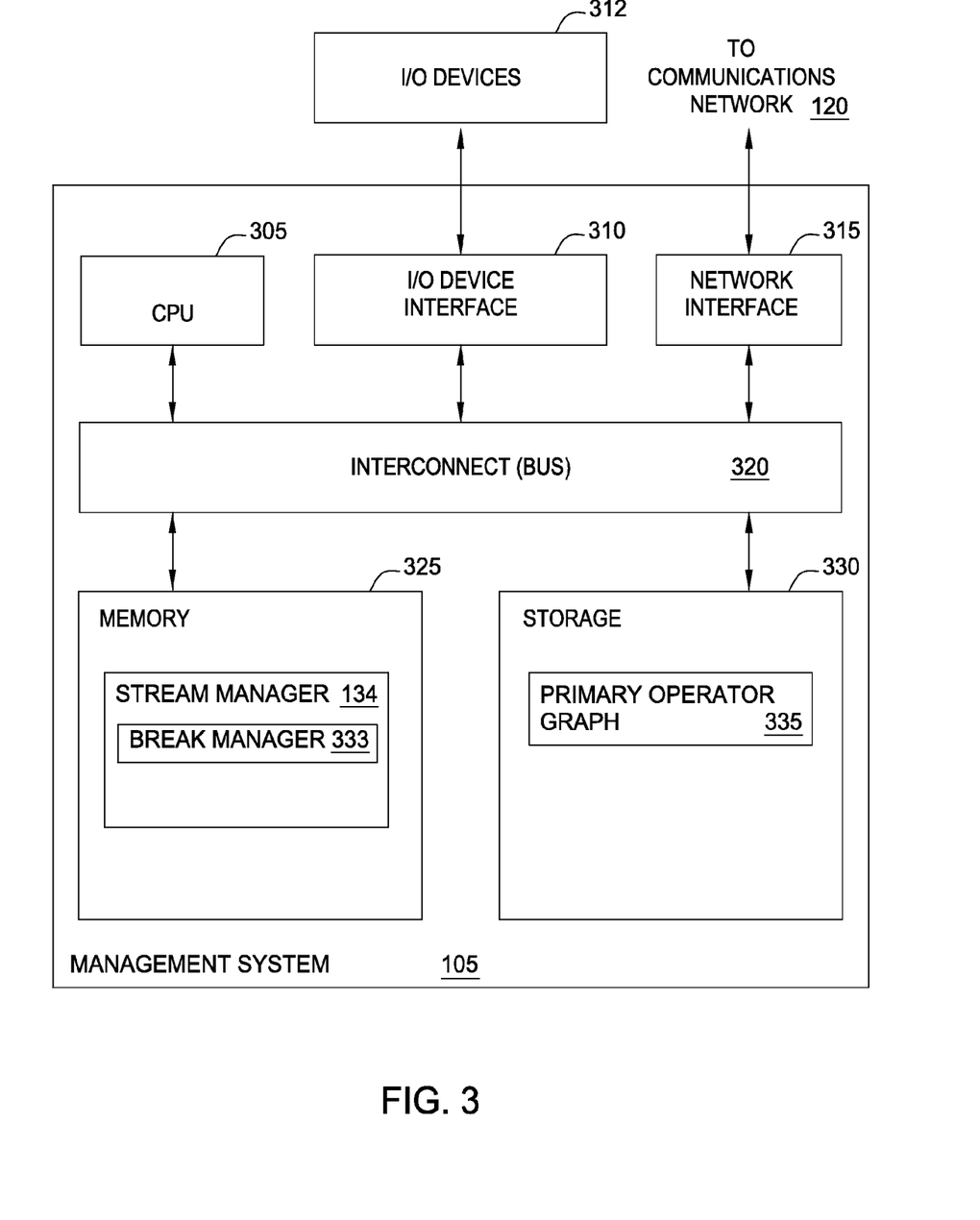
FIG. 3 is a more detailed view of the server management system of FIGS. 1A-1B, according to one embodiment disclosed herein.

FIG. 3 is a more detailed view of the server management system 105 of FIG. 1, according to one embodiment disclosed herein. As shown, server management system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes an operator graph 132. The stream manager 134 may use the operator graph 132 to route tuples to PEs 235 for processing. As shown, the stream manager 134 also contains break manager 333. The break manager 333 generally allows for the definition of timing breakpoints within the streams application. A breakpoint is generally defined as a stopping point within an application for the purpose of debugging. Once triggered, a breakpoint will halt all processing in the application. In a streams environment, this may include halting all processing within all operators in the operator graph. The conditions which trigger a breakpoint traditionally must occur simultaneously, which, as discussed above, is difficult to pinpoint in a streams application. Therefore, in a streams application, a window of tuples may be used as a reference point to define the "simultaneous" context within which a breakpoint condition must occur. A window is generally defined as a logical container for data tuples received at the operator which may or may not have been processed by the operator. For example, a grouping of 1, 10, or 100 tuples may be defined to be a window within a particular operator. The "timing breakpoints" disclosed herein are defined by the break manager 333, and may incorporate this window context. The timing breakpoints may be defined to be specific to one operator, several operators, or may be globally defined to apply to all operators in the operator graph 132. In some embodiments disclosed herein, the break manager 333 may provide a window to an operator which does not support a window by default.

Stream computing applications may provide at least two types of windows, including tumbling windows and sliding windows. An operator may not support windows by default. Both tumbling and sliding windows store tuples preserving the order of arrival at the operator, but differ in how they handle tuple evictions. Rather than keeping all tuples ever inserted, windows are configured to evict expired tuples. In this respect, tumbling windows operate in batches; when a tumbling window is full, all the tuples in the window are evicted. This is called a window flush. After a tumbling window has been flushed, the window is not triggered until the buffer 260 contains the requisite number of tuples or a predefined period of time has elapsed. On the other hand, sliding windows operate in an incremental fashion. When a sliding window is full, future tuple insertions generally result in evicting the oldest tuples in the window. Triggering a new sliding window may occur as a new tuple is received, or when a predefined period of time has elapsed. The details of tuple eviction in a sliding window are defined by the eviction policy. In both a tumbling and sliding window, the windowing policy defines a trigger policy based on a predefined number of received tuples or the expiration of a predefined period of time.

Figure 4:
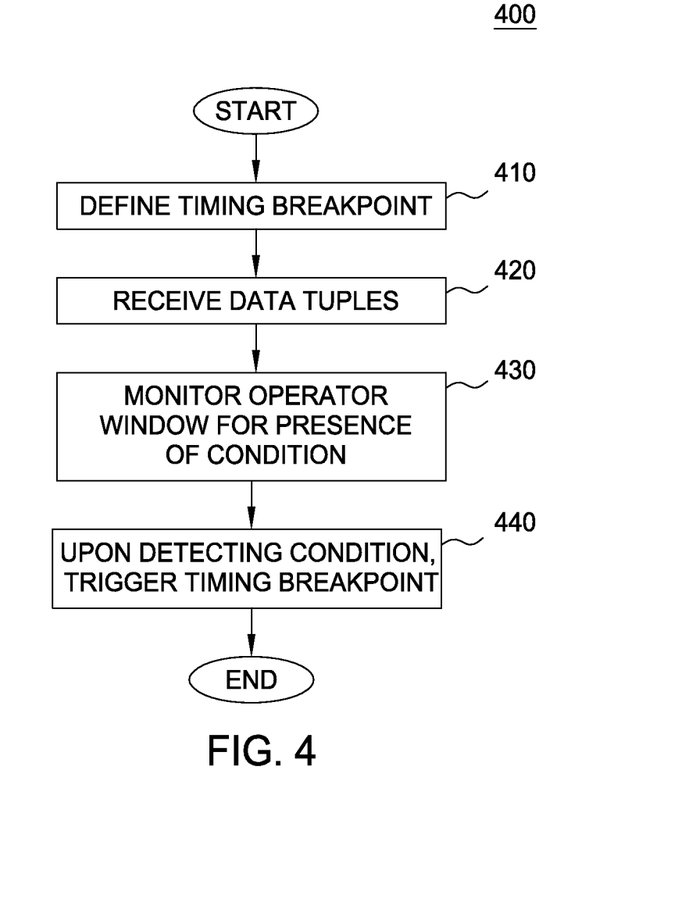
FIG. 4 is a flowchart depicting a method for streams debugging within a windowing condition, according to one embodiment disclosed herein.

FIG. 4 is a flowchart depicting a method 400 for streams debugging within a windowing condition, according to one embodiment disclosed herein. In some embodiments, the break manager 333 performs the steps of the method 400. At step 410, the break manager 333 defines a timing breakpoint. A timing breakpoint is a breakpoint where multiple conditions need to be met, executing in some cases in separate processes, in some cases on different computing nodes. In some embodiments, the conditions must occur within a window of data tuples within the operator. In some embodiments, the conditions may need to occur within a specified time frame, which may be defined by a window of tuples within the operators. As stated above, the breakpoint may be defined as to a single operator, several operators, or all operators in the operator graph 132. The definition of a timing breakpoint is discussed in further detail with reference to FIG. 5. At step 420, data tuples are received throughout the operator graph as the streams application begins executing. At step 430, the break manager 333 monitors the windows of the operators to detect the presence of the conditions which trigger the timing breakpoint. At step 440, upon detecting the presence of the condition, the break manager 333 triggers a timing breakpoint, halting execution of the streams application, and providing a debugging environment.

Figure 5:
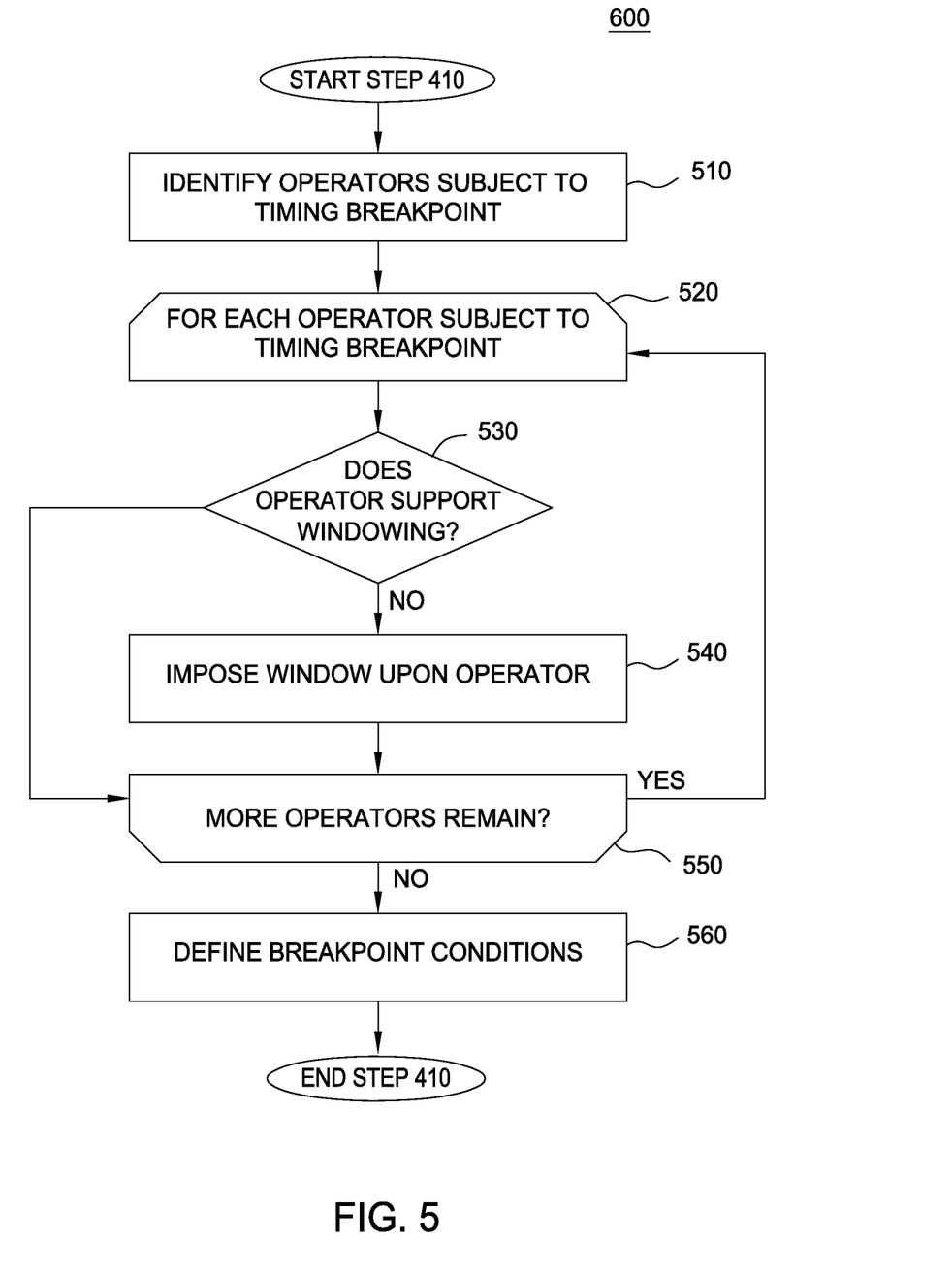
FIG. 5 is a flowchart depicting a method for defining a timing breakpoint, according to one embodiment disclosed herein.

FIG. 5 is a flowchart depicting a method 500 corresponding to step 410 for defining a timing breakpoint, according to one embodiment disclosed herein. In some embodiments, the break manager 333 performs the steps of the method 500. At step 510, the break manager 333 identifies the operators subject to the timing breakpoint. The operators subject to the timing breakpoint may be defined by a user, or may be specified by the break manager 333. In some embodiments, all operators in the operator graph 132 may be subject to the conditions of a timing breakpoint. In other embodiments, one operator or several operators may be subject to the timing breakpoint. The specification of operators subject to the timing breakpoint is essential in a streams programming environment because in many embodiments, the conditions triggering the timing breakpoint may only be detected within a window of the operator.

At step 520, the break manager 333 begins executing a loop containing steps 530-550 for each operator subject to the timing breakpoint. At step 530, the break manager 333 determines whether the operator supports windowing by default. In some embodiments, operator properties specify whether the operator supports windowing. In other embodiments, operator models provide information indicating whether the operator supports windowing. In some embodiments, providing a window for an operator subject to the timing breakpoint is necessary to provide a context within which the break manager 333 may examine the contents of the tuples being processed by the operator to detect the presence of a specified condition. Therefore, in some embodiments, a window provides the timing context within which a timing breakpoint condition must occur. If the operator supports windowing, the break manager 333 proceeds to step 550. Otherwise, the break manager 333 proceeds to step 540. At step 540, the break manager 333 imposes a window upon the operator. In imposing a window upon the operator, the break manager 333 specifies parameters for the window, including, but not limited to a window type, an eviction policy, and a trigger policy. A window type, as described above, may be tumbling, sliding, or any other type of window. The window types and policies described herein are merely illustrative and should not be considered limiting of the disclosure, as all types of windows and policies are contemplated. An eviction policy defines the number of tuples which constitute a full window to trigger processing by the operator. A trigger policy indicates an event which triggers processing of the tuples in the window by the operator. Each windowing type keeps all members in memory until a trigger is reached, which then evicts tuples based on the eviction policy. In some embodiments, the break manager 333 may provide the window parameters. In other embodiments, a user may specify the window parameters. In other embodiments, a history of tuples flowing through the operator may be maintained to define the window. When the operator is provided with a windowing condition, the operator must uphold the window and its conditions when executing in debugging mode.

At step 550, the break manager 333 determines whether additional operators subject to the timing breakpoint remain. If more operators remain, the break manager 333 proceeds to step 520. If all operators have been processed, the break manager 333 proceeds to step 560. At step 560, discussed in greater detail with reference to FIG. 6, the break manager 333 defines breakpoint conditions. The conditions of a timing breakpoint are conditions which, when discovered, trigger the timing breakpoint. One example of a timing breakpoint condition would be the presence of a tuple attribute in a first operator window matching a tuple attribute in a second operator window, where the application is configured to have operators process tuples sequentially. For example, in an application having operators A, B, C, D, and E, a user may define a breakpoint condition to stop the application when operator A's window has a tuple attribute that matches a tuple attribute in operator E's window.

Figure 6:
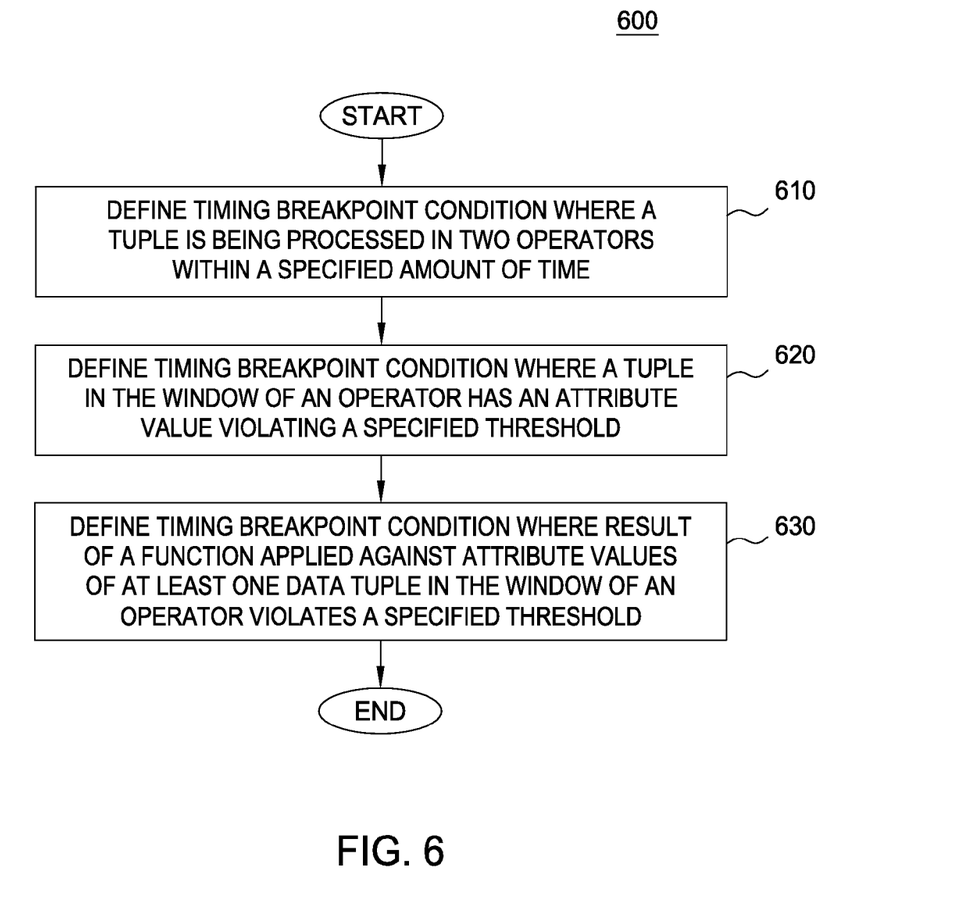
FIG. 6 is a flowchart depicting a method for defining timing breakpoint conditions, according to one embodiment disclosed herein.

FIG. 6 is a flowchart depicting a method 600 corresponding to step 560 for defining timing breakpoint conditions, according to one embodiment disclosed herein. In some embodiments, the break manager 333 performs the steps of the method 600. Although depicted as a flowchart, the break manager 333 may perform one, several, or all of the steps of the method 600 to define conditions for a timing breakpoint. At step 610, the break manager 333 defines a timing breakpoint condition where a tuple is being processed in two operators at the same time. In some embodiments, a window of tuples in the operator is used to define the amount of time. The window may be used as the frame of reference, as the window will contain at most a fixed number of tuples within a specified unit of time. As a first example, in embodiments where the streams application is configured to process tuples sequentially, if the break manager 333 detects a unique tuple in the window of two different operators, the condition is met. The condition would be met in such a setting because the presence of a unique tuple being processed by two operators at roughly the same time can be a signal that an error has occurred, as the same tuple should not be present in the window of two operators at the same time. As another example, the streams application may not process tuples sequentially, but tuples may share a unique attribute value, and other tuple attributes may trigger a breakpoint. For example, in a banking application, in a first operator window, a first tuple from a first user having a unique userID may specify that the first user is executing a banking transaction at a first location. At about the same time, in a second operator window, a second tuple from the first user may specify that the first user is executing a banking transaction at a second location, physically different from the first location. If the break manager 333 were to detect these conflicting locations in two operator windows, the condition would be met. The condition would be met because the first user cannot physically be in two different locations at the same time.

In one embodiment, conditions occurring in the windows of operators in different operator graphs may trigger a timing breakpoint. Therefore, the windows of operators in more than one operator graph may be monitored to detect the presence of conditions which may trigger a timing breakpoint. Upon triggering the timing breakpoint, execution may be halted in the operators of none, some, or all of the operator graphs. For example, the stream manager 134 may access the memory shared by all stream managers to monitor the contents of windows against the contents of windows being monitored by the stream manager 134. For example, a database may be shared by all stream managers, and window contents may be written by each stream manager to the database. Upon detecting, in the shared database, tuples in windows across operator graphs which meet the condition, the timing breakpoint may be triggered. In embodiments employing a hierarchical arrangement of stream managers that allow the different stream managers to communicate, stream managers in the hierarchy may monitor windows in their own operator graph and share the operator window data with the other stream managers in the hierarchy. Additionally, a higher-level stream manager in the hierarchy may monitor operator windows across multiple operator graphs to detect the presence of conditions which may trigger a timing breakpoint. By implementing timing breakpoints across operator graphs, fraudulent activity may be detected across separate operator graphs executing sales applications for two different retailers when one person's credit card is being used for nearly simultaneous in-person transactions in one retailer's California store and the other retailer's New York store.

At step 620, the break manager 333 defines a timing breakpoint condition where a tuple in the window of an operator has an attribute value violating a specified threshold. This type of timing breakpoint condition occurs when a tuple has an attribute value whose values exceed specified bounds. For example, a salary threshold may be set for the salaries of a group of employees. The threshold may be defined by a user, or by the break manager 333. The threshold may have an upper bound, a lower bound, or both. The salary threshold may therefore be defined as setting a $100,000 maximum for employee salaries, a $30,000 minimum for employee salaries, or both. The threshold may apply to all operators, or a given subset of operators. Therefore, when the break manager 333 detects a data tuple having a salary attribute of $1,000,000 in an operator subject to the maximum salary timing breakpoint condition, the break manager 333 will trigger the timing breakpoint, and execution of the application will halt.

At step 630, the break manager 333 defines a timing breakpoint condition where the result of a function applied against attribute values of at least one data tuple in the window of an operator violates a specified threshold. Thus, the break manager 333 is configured to examine attribute values within a window of the operator, and performs specific functions on the values. The result of the function may be checked against a threshold specified by a user, or specified the break manager 333. For example, the break manager 333 may average the values of salary tuples to determine whether the average salary falls within a specified range. As another example, the break manager 333 may set a tolerance threshold for "bad" attribute values. If a scanner emits a particular attribute, "0" for example, as a "bad" value, 20 bad attribute values of "0" received from a scanner in a window of 100 tuples may be defined as the timing breakpoint condition. If the break manager 333 detects more than 20 tuples having "0" attribute values, the application may assume that something is wrong with the scanner, and since the timing breakpoint condition is met, application execution will halt. The examples provided herein are merely exemplary, as any computational function may be applied to the tuple attributes to determine whether the result of the function violates a specified threshold. Furthermore, any type of condition may be defined to trigger a breakpoint, and those examples provided with reference to FIG. 6 should not be considered limiting of the disclosure.

Figure 7:
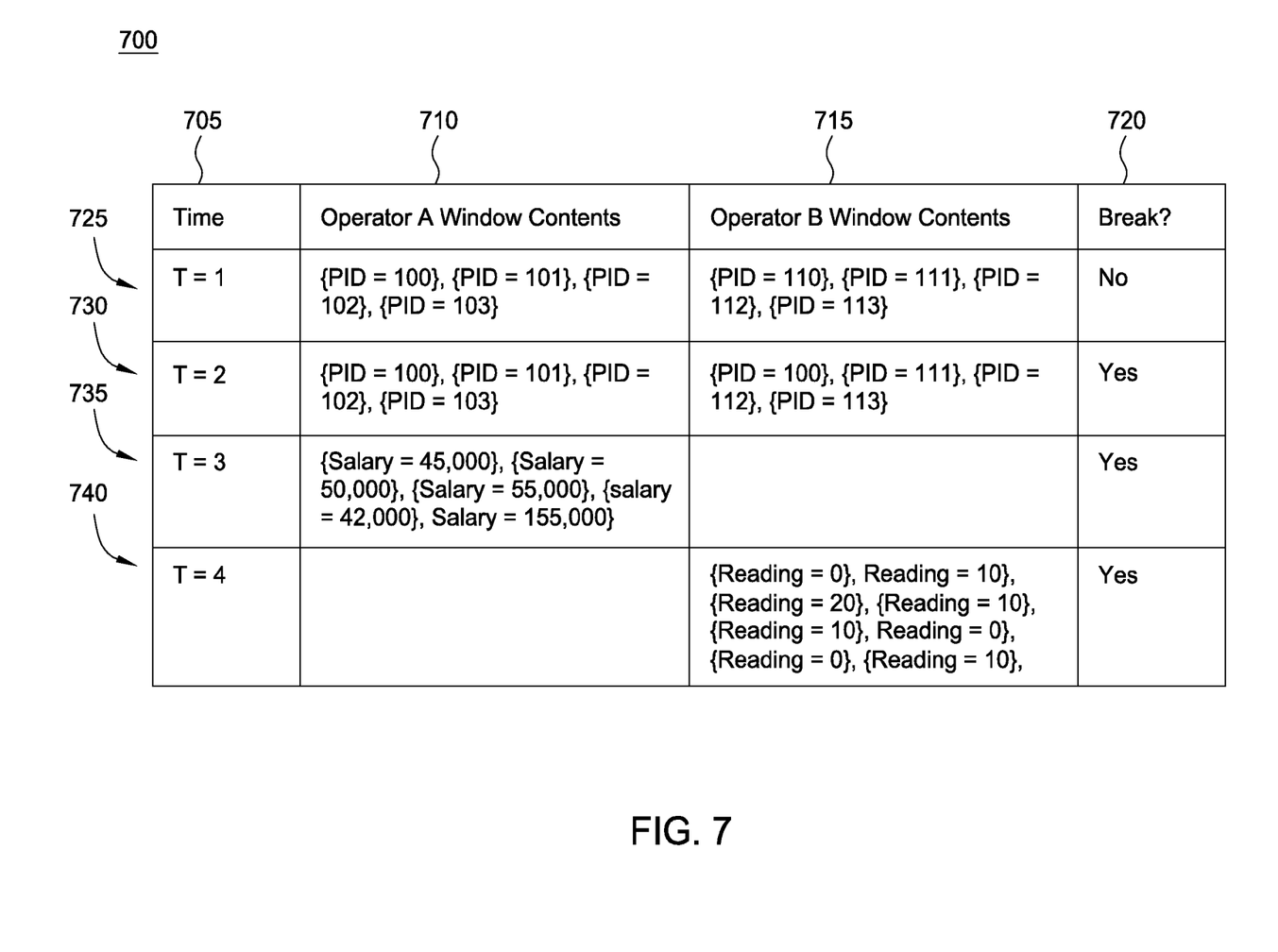
FIG. 7 illustrates a table depicting whether operator window contents will trigger a timing breakpoint, according to one embodiment disclosed herein.

FIG. 7 illustrates a table 700 indicating whether operator window contents will trigger a timing breakpoint, according to one embodiment disclosed herein. As shown, the table depicts, at a given time in column 705, the contents of a window of exemplary operator A in column 710, the contents of a window of exemplary operator B in column 715, and whether an exemplary timing breakpoint will be triggered in column 720. In row 725, an exemplary point in time T=1 is provided. Note that the time value merely provides a context for the contents of an operator window at a given time. As shown in row 725, the contents of the window of operator A are tuples having processing ID (PID) values: {PID=100}, {PID=101}, {PID=102}, and {PID=103}, and the contents of the window of operator B are tuples {PID=110}, {PID=111}, {PID=112}, and {PID=113}. Assume, for the contents of rows 725 and 730, the timing breakpoint condition specifies that no tuples having duplicate PIDs can be in the window of operator A and operator B at the same time, as the operators must process all data tuples sequentially. Because, in row 725, each window has unique PID attribute values, the timing breakpoint has not been triggered. Moving to row 730 for T=2, the contents of the window of operator A are still {PID=100}, {PID=101}, {PID=102}, and {PID=103}, however the contents of operator B are now {PID=100}, {PID=111}, {PID=112}, and {PID=113}. Because the tuple {PID=100} is present in both operator A and operator B, the timing breakpoint will be triggered, and the application will halt.

In row 735, corresponding to T=3, the tuples contain salary data. Assume, for the purpose of row 735, that the timing breakpoint condition specifies that in the window of operator A, tuple salary attributes must have values less than 65,000. The contents of the window of operator A in row 735 are {Salary=45,000}, {Salary=50,000}, {Salary=55,000}, {salary=42,000}, and {Salary=155,000}. Because the final tuple has a salary attribute of 155,000, greater than 65,000, the timing breakpoint condition is met, and the timing breakpoint is triggered. Tuples for operator B are not shown because the conditions refer only to operator A's window. In row 740, corresponding to T=4, the tuples contain values received from a sensor. Assume, for the purpose of row 740, that the sensor emits values of "0" when an error occurs. Assume further that the timing breakpoint condition specifies that the window of operator B, which has a size of 8 data tuples, must have fewer than three reading values which equal "0". As shown, the contents of operator B's window in row 740 are {Reading=0}, {Reading=10}, {Reading=20}, {Reading=10}, {Reading=10}, {Reading=0}, {Reading=0}, and {Reading=10}. Tuples for operator A are not shown because the conditions refer only to operator B's window. Because there are three readings in the window of operator B having values which equal "0," the condition has been satisfied, and the timing breakpoint will be triggered.

In distributed computing, events generally do not occur at the exact same time, meaning that breakpoints may not be triggered if the breakpoint conditions must occur simultaneously. By defining a timing breakpoint in a streams computing environment as described herein, streams applications developers may detect conditions which occur in a given time frame. By examining tuples in a window of an operator, a time frame may be defined such that a timing breakpoint may be determined to exist, allowing streams application developers to properly debug streams applications.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising: providing a plurality of processing elements comprising one or more operators,
    the operators configured to process streaming data tuples by operation of one or more computer processors;
    establishing an operator graph of a plurality of operators, the operator graph defining at least one execution path in which a first operator of the plurality of operators is configured to receive data tuples from at least one upstream operator and transmit data tuples to at least one downstream operator;
    defining a breakpoint comprising a condition, the condition comprising a concurrent existence of a unique attribute value of data tuple in: (i) a first window of a first operator, and (ii) a second window of a second operator, wherein the first and second windows comprise a plurality of data tuples in the first and second operators, respectively; and
    upon detecting occurrence of the condition, triggering the breakpoint to halt processing by each of the plurality of operators in the operator graph.

2. The method of claim 1, wherein triggering the breakpoint comprises:
    receiving a plurality of data tuples in the operator graph;
    monitoring the windows of the operators for occurrence of the condition; and
    upon detecting the occurrence of the condition, halting execution in each of the plurality of operators in the operator graph.

3. The method of claim 1, wherein the condition must occur within a specified amount of time, wherein the time is defined by a specified count of data tuples within the window of the respective operator.

4. The method of claim 1, wherein the first operator is in a first operator graph and the second operator is in a second operator graph, wherein triggering the breakpoint halts processing in the first operator graph and the second operator graph.

5. The method of claim 1, further comprising imposing a window on an operator not configured to maintain a window of tuples.

6. The method of claim 5, wherein imposing the window comprises utilizing a history of data tuples processed by the operator not configured to maintain the window of tuples.

7. A method, comprising:
    providing a plurality of processing elements comprising one or more operators, the operators configured to process streaming data tuples by operation of one or more computer processors;
    establishing an operator graph of a plurality of operators, the operator graph defining at least one execution path in which a first operator of the plurality of operators is configured to receive data tuples from at least one upstream operator and transmit data tuples to at least one downstream operator;
    defining define a breakpoint comprising a condition, the condition specifying that a result of a function applied against an attribute value of a data tuple in a window of an operator exceeds a first specified attribute threshold, wherein the window comprises a plurality of data tuples in the operator; and
    upon detecting occurrence of the condition, triggering the breakpoint to halt processing by each of the plurality of operators in the operator graph.

8. The method of claim 7, wherein the condition must occur within a specified amount of time, wherein the time is defined by a specified count of data tuples within the window of the operator, wherein the condition further specifies: (i) that the attribute value of the data tuple in the window of the operator exceeds a second specified attribute threshold, and (ii) the concurrent existence of a first data tuple in: (i) a first window of a first operator, and (ii) a second window of a second operator.

9. The method of claim 8, wherein triggering the breakpoint comprises:
    receiving a plurality of data tuples in the operator graph;
    monitoring the windows of the operators for occurrence of the condition; and
    upon detecting the occurrence of the condition, halting execution in each of the plurality of operators in the operator graph.

10. The method of claim 9, further comprising:
    upon determining that a third operator of the plurality of operators is not configured to maintain a window of data tuples:
        defining a window of the third operator comprising a plurality of attributes, the plurality of attributes comprising: (i) a window type, an eviction policy, and a trigger policy for the third window; and
        imposing the defined window on the third operator.

11. A method, comprising:
    providing a plurality of processing elements comprising one or more operators, the operators configured to process streaming data tuples by operation of one or more computer processors;
    establishing an operator graph of a plurality of operators, the operator graph defining at least one execution path in which a first operator of the plurality of operators is configured to receive data tuples from at least one upstream operator and transmit data tuples to at least one downstream operator;
    defining define a breakpoint comprising a condition, the condition specifying that a first data tuple in a window of an operator has an attribute value violating a specified attribute threshold, wherein the window comprises a plurality of data tuples in the operator; and
    upon detecting occurrence of the condition, triggering the breakpoint to halt processing by each of the plurality of operators in the operator graph.

12. The method of claim 11, wherein triggering the breakpoint comprises:
    receiving a plurality of data tuples in the operator graph;
    monitoring the windows of the operators for occurrence of the condition; and
    upon detecting the occurrence of the condition, halting execution in each of the plurality of operators in the operator graph.

13. The method of claim 11, wherein the condition must occur within a specified amount of time, wherein the time is defined by a specified count of data tuples within the window of the respective operator.

14. The method of claim 11, wherein the attribute threshold indicates that the attribute value of the first tuple in a first window of a first operator graph cannot equal an attribute value of a second data tuple in a second window of a second operator graph, wherein triggering the breakpoint halts processing in the first operator graph and the second operator graph.

15. The method of claim 11, further comprising imposing a window on an operator not configured to maintain a window of tuples.

16. The method of claim 1, wherein the first and second operators are configured to sequentially process the data tuples in the first and second windows, wherein the data tuples in the first and second windows are duplicate data tuples, the duplicate data tuples comprising each attribute value of the data tuples in the first and second windows being identical.

* * * * *